(12) United States Patent
Ventura et al.

(10) Patent No.: US 7,654,615 B2
(45) Date of Patent: Feb. 2, 2010

(54) SEAT ASSEMBLY HAVING A SEAT CUSHION ROCKER MECHANISM

(75) Inventors: Kevin J. Ventura, Aschaffenburg (DE); Bernd Winkelhake, Gifhorn (DE)

(73) Assignee: Intier Automotive Seating Systems GmbH, Sailuf (DE)

( * ) Notice: Subject to any disclaimer, the term of this patent is extended or adjusted under 35 U.S.C. 154(b) by 0 days.

(21) Appl. No.: 12/066,396

(22) PCT Filed: Sep. 15, 2006

(86) PCT No.: PCT/EP2006/009016

§ 371 (c)(1),
(2), (4) Date: Mar. 11, 2008

(87) PCT Pub. No.: WO2007/031335

PCT Pub. Date: Mar. 22, 2007

(65) Prior Publication Data

US 2008/0224519 A1    Sep. 18, 2008

(51) Int. Cl.
*B60N 2/12* (2006.01)
(52) U.S. Cl. .................................. 297/344.15
(58) Field of Classification Search ............. 297/344.15
See application file for complete search history.

(56) References Cited

U.S. PATENT DOCUMENTS

| 5,676,424 | A | 10/1997 | Winklehake | |
|---|---|---|---|---|
| 5,863,098 | A * | 1/1999 | Kojima et al. | 297/344.15 |
| 6,186,572 | B1 | 2/2001 | Oh | |
| 6,290,198 | B1 * | 9/2001 | Kojima et al. | 297/344.15 X |
| 6,398,307 | B1 | 6/2002 | Schmidt et al. | |
| 6,422,651 | B1 * | 7/2002 | Muhlberger et al. | 297/344.15 X |
| 6,425,557 | B1 * | 7/2002 | Becker et al. | 297/344.15 X |
| 6,464,193 | B1 * | 10/2002 | Nemoto | 297/344.15 X |
| 6,488,337 | B1 * | 12/2002 | De Voss et al. | 297/344.15 X |
| 6,533,351 | B2 * | 3/2003 | Deptolla | 297/344.15 X |
| 6,666,423 | B1 * | 12/2003 | Nemoto | 297/344.15 X |
| 6,767,061 | B2 | 7/2004 | Ogino et al. | |

(Continued)

FOREIGN PATENT DOCUMENTS

DE    4429405 A1    2/1996

(Continued)

*Primary Examiner*—Rodney B White
(74) *Attorney, Agent, or Firm*—Hossle Kudlek & Partner; Markus Hossle

(57) ABSTRACT

A seat assembly (10) for supporting an occupant above a floor in a vehicle includes a seat cushion (12) coupled to a pair of spaced apart risers (20, 22) extending between forward (24) and rearward (26) ends and a seat back (16) pivotally coupled thereto. A rocker mechanism (58) selectively angularly adjusts the seat cushion (12) relative to the floor. A first pivot (70) pivotally connects the rearward ends (26) of the risers (20, 22) to the floor. A sector gear (92) is pivotally coupled to the riser adjacent the forward end and includes a mounting pin (94) offset from the pivotal connection. A rocker link (96) extends from a first end pivotally coupled to the floor and a second end pivotally coupled to the mounting pin (94) for guiding the forward ends (24) of the risers (20, 22) during pivotal movement about the first pivot (70). A pawl (102) is pivotally coupled to the rocker link (96) for selectively engaging the sector gear (92) to maintain the angular position of the seat assembly (10).

11 Claims, 8 Drawing Sheets

U.S. PATENT DOCUMENTS

| | | | |
|---|---|---|---|
| 6,843,460 B2 * | 1/2005 | Koga et al. | 297/344.15 X |
| 6,902,234 B2 * | 6/2005 | Becker et al. | 297/344.15 X |
| 7,066,540 B2 * | 6/2006 | Minai et al. | 297/344.15 |
| 7,077,471 B2 * | 7/2006 | Schumann et al. | 297/344.15 X |
| 7,278,686 B2 * | 10/2007 | Yoshida | 297/344.15 X |
| 7,316,454 B2 * | 1/2008 | Yoshida | 297/344.15 X |
| 7,338,118 B2 * | 3/2008 | Ichikawa et al. | 297/344.15 X |
| 2003/0047975 A1 | 3/2003 | Becker et al. | |
| 2004/0135411 A1 | 7/2004 | Hensley et al. | |
| 2005/0134100 A1 * | 6/2005 | Canteleux et al. | 297/344.15 |
| 2006/0001306 A1 * | 1/2006 | Becker et al. | 297/344.15 |
| 2006/0061176 A1 * | 3/2006 | Sakai et al. | 297/344.15 |

FOREIGN PATENT DOCUMENTS

DE  19938717 A1  2/2001

* cited by examiner

SEAT ASSEMBLY HAVING A SEAT CUSHION ROCKER MECHANISM

BACKGROUND OF THE INVENTION

1. Field of the Invention

The invention relates to a seat assembly for an automotive vehicle. More particularly, the invention relates to a seat assembly having a rocker mechanism for adjusting the angular position of the seat cushion relative to the floor of the vehicle.

2. Description of the Related Art

Automotive vehicles include seat assemblies for supporting occupants within the vehicle. Seat assemblies are typically arranged within at least a front, or first row, and a rear, or second row, of the vehicle. Each seat assembly typically includes a generally horizontal seat cushion coupled to a generally vertical seat back. It is known in the art to provide a vertical height adjuster for raising and lowering the height of the seat assembly relative to a floor of the vehicle to provide for occupant comfort. Various adjusters currently provide the vertical height adjustment either manually or through a powered motor assembly. It is also know in the art to provide a powered motor assembly to adjust the angular position of the seat cushion relative to the floor of the vehicle. However, it remains desirable to provide a manual rocker mechanism for selectively adjusting the angular position of the seat cushion relative to the floor of the vehicle.

SUMMARY OF THE INVENTION

According to one aspect of the invention, there is provided a seat assembly adapted to be coupled to the floor of an automotive vehicle. The seat assembly includes a pair of spaced apart risers extending between forward and rearward ends for supporting the seat assembly above the floor of the vehicle. A pair of track assemblies mounts the seat assembly to the floor of the vehicle. A seat cushion is coupled to the risers for supporting an occupant in the seat assembly and a seat back is pivotally coupled to the risers. A rocker mechanism selectively adjusts the angular position of the seat cushion relative to the floor of the vehicle. The rocker mechanism includes a first pivot pivotally connecting the rearward ends of the risers to the respective track assemblies. A sector gear is pivotally coupled to the riser adjacent the forward end thereof and includes a mounting pin offset from the pivotal connection to the riser. A rocker link extends from a first end pivotally coupled to the track assembly and a second end pivotally coupled to the mounting pin on the sector gear for supporting and guiding the forward ends of the risers during pivotal movement about the first pivot. A pawl is pivotally coupled to the rocker link for selectively engaging and locking the sector gear to maintain the selectively adjusted angular position of the seat assembly.

BRIEF DESCRIPTION OF THE DRAWINGS

Other advantages of the present invention will be readily appreciated as the same becomes better understood by reference to the following detailed description when considered in connection with the accompanying drawings, wherein.

DETAILED DESCRIPTION OF THE PREFERRED EMBODIMENT

Figure 1:
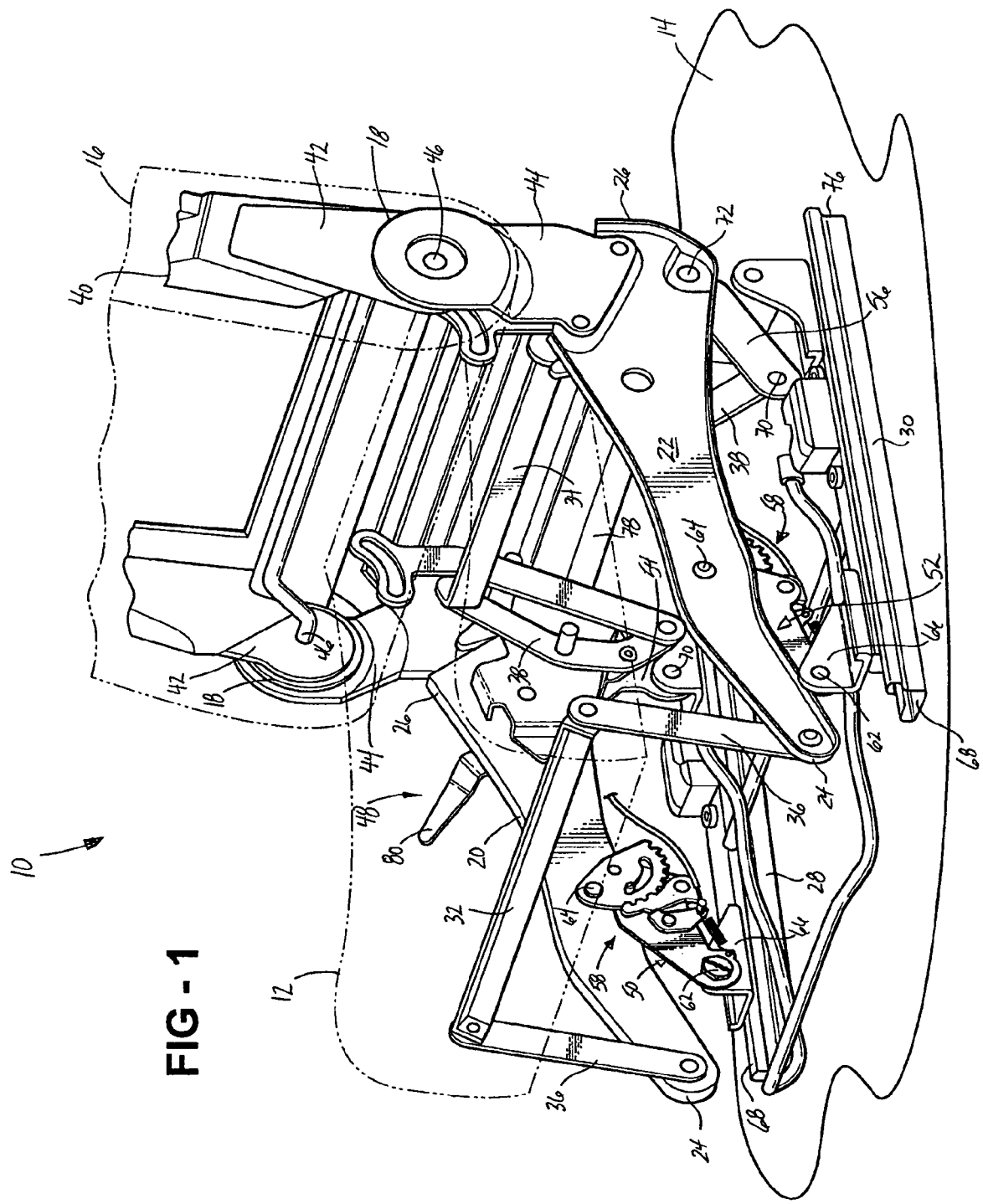
FIG. 1 is a left front perspective view of a seat assembly including a vertical height adjuster and a rocker mechanism according to one embodiment of the invention.

Referring to FIG. 1, there is illustrated a seat assembly, generally shown at 10, for an automotive vehicle. The seat assembly 10 includes a seat cushion 12 for supporting a seat occupant above a floor 14 of the vehicle. The seat assembly 10 also includes a seat back 16 pivotally coupled to the seat cushion 12 and movable between an upright position, shown in FIG. 1, and a forwardly pivoted flat position overlying the seat cushion 12. The seat back 16 is pivotally coupled to the seat cushion 12 by a pair of recliner mechanisms 18, as is commonly known in the art, for providing pivotal movement of the seat back 16 between the upright position and the fold flat position. The recliner mechanisms 18 may also provide fore and aft pivotal reclining adjustment of the seat back 16 relative to the seat cushion 12 for occupant comfort.

The seat cushion 12 is supported by a pair of spaced apart risers 20, 22. The risers 20, 22 extend between a forward end 24 and a rearward end 26. A pair of spaced apart track assemblies 28, 30 provides selective fore and aft sliding adjustment of the seat assembly 10 within the vehicle as is commonly known in the art. Each track assembly 28, 30 is operatively coupled to one of the respective risers 20, 22 for mounting the seat assembly 10 to the floor 14 of the vehicle. Laterally extending front 32 and rear 34 support rods are included for supporting and connecting the seat cushion 12 above and between the spaced apart risers 20, 22. A pair of front cushion support links 36 is pivotally coupled between the front support rod 32 and the risers 20, 22 for pivotally supporting the seat cushion 12. A pair of rear cushion support links 38 is pivotally coupled between the rear support rod 34 and the risers 20, 22 also for pivotally supporting the seat cushion 12.

The seat back 16 includes a seat back frame 40. A recliner bracket 42 extends from each side of the seat back frame 40 adjacent the lower end thereof. A support bracket 44 is pivotally coupled to each of the recliner brackets 42 and each support bracket 44 is fixedly secured to the rearward end 26 of one of the risers 20, 22 for pivotally supporting the seat back 16. Each recliner mechanism 18 includes a pivot shaft 46 pivotally connecting the recliner bracket 42 and the support bracket 44 to provide pivotal movement of the seat back 16 between the upright and fold flat positions.

Figure 2:
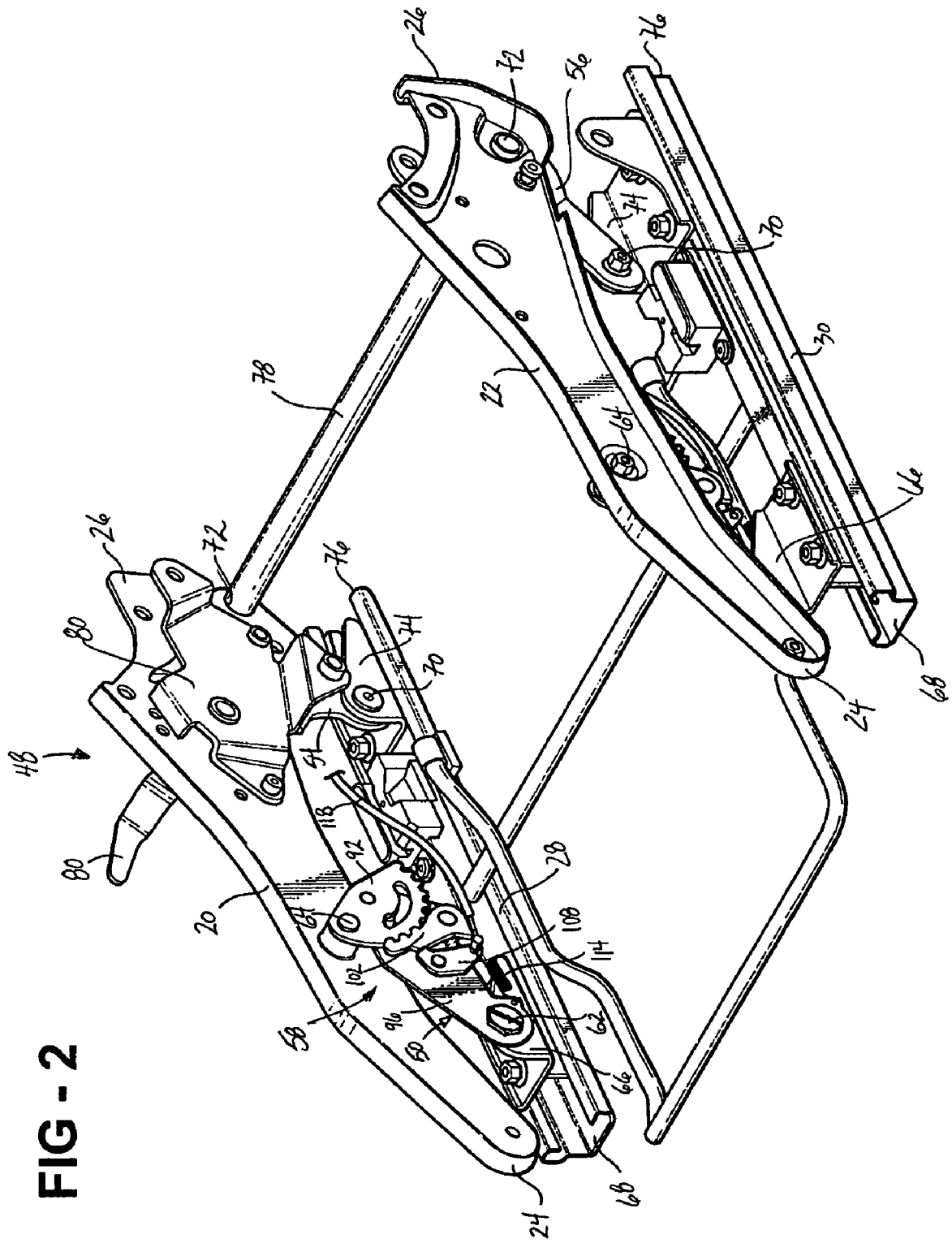
FIG. 2 is a fragmentary, left front perspective view of the seat assembly of FIG. 1.
Figure 5:
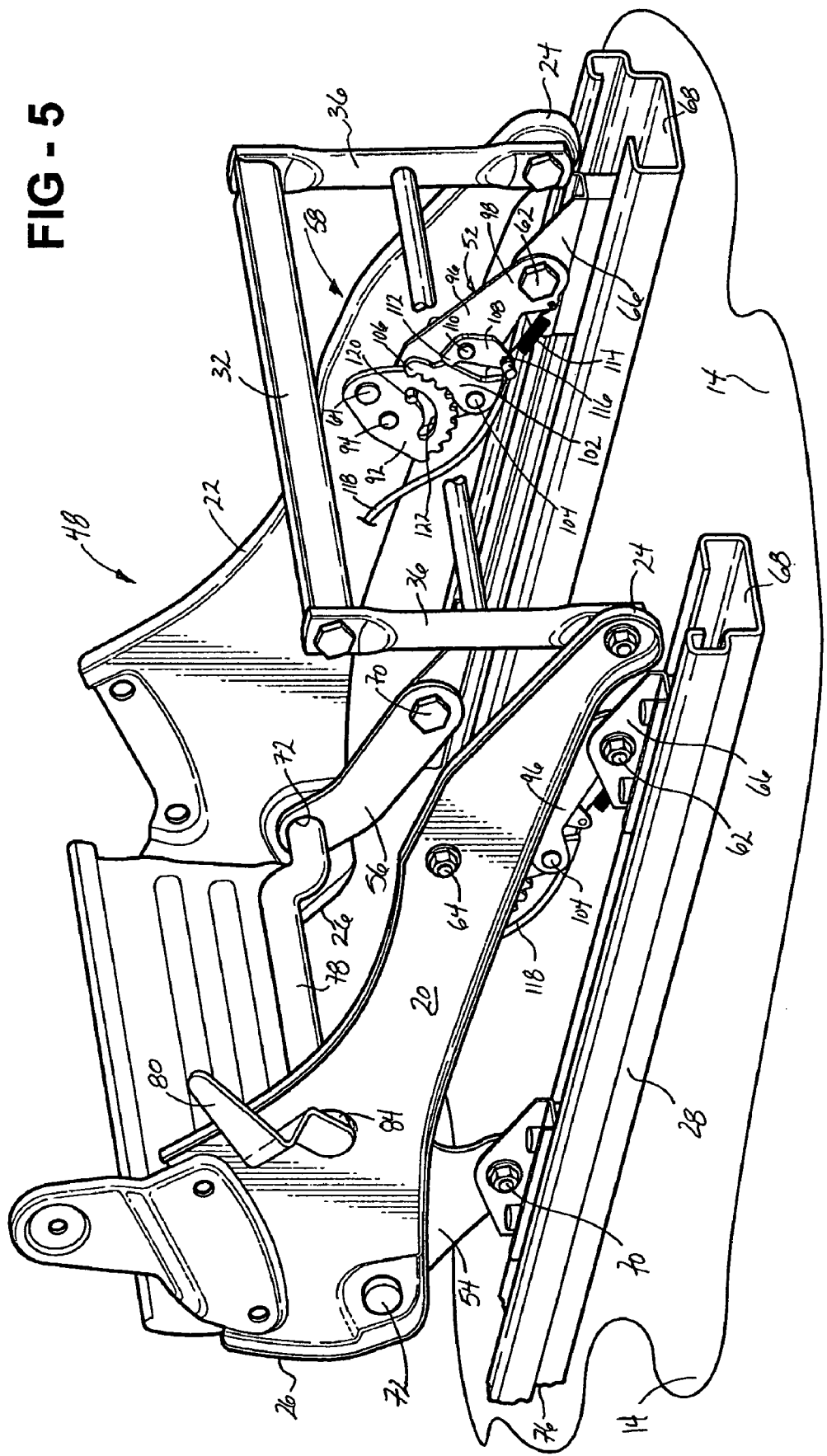
FIG. 5 is a fragmentary, right front perspective view of the seat assembly illustrating the vertical height adjuster and the rocker mechanism.
Figure 6:
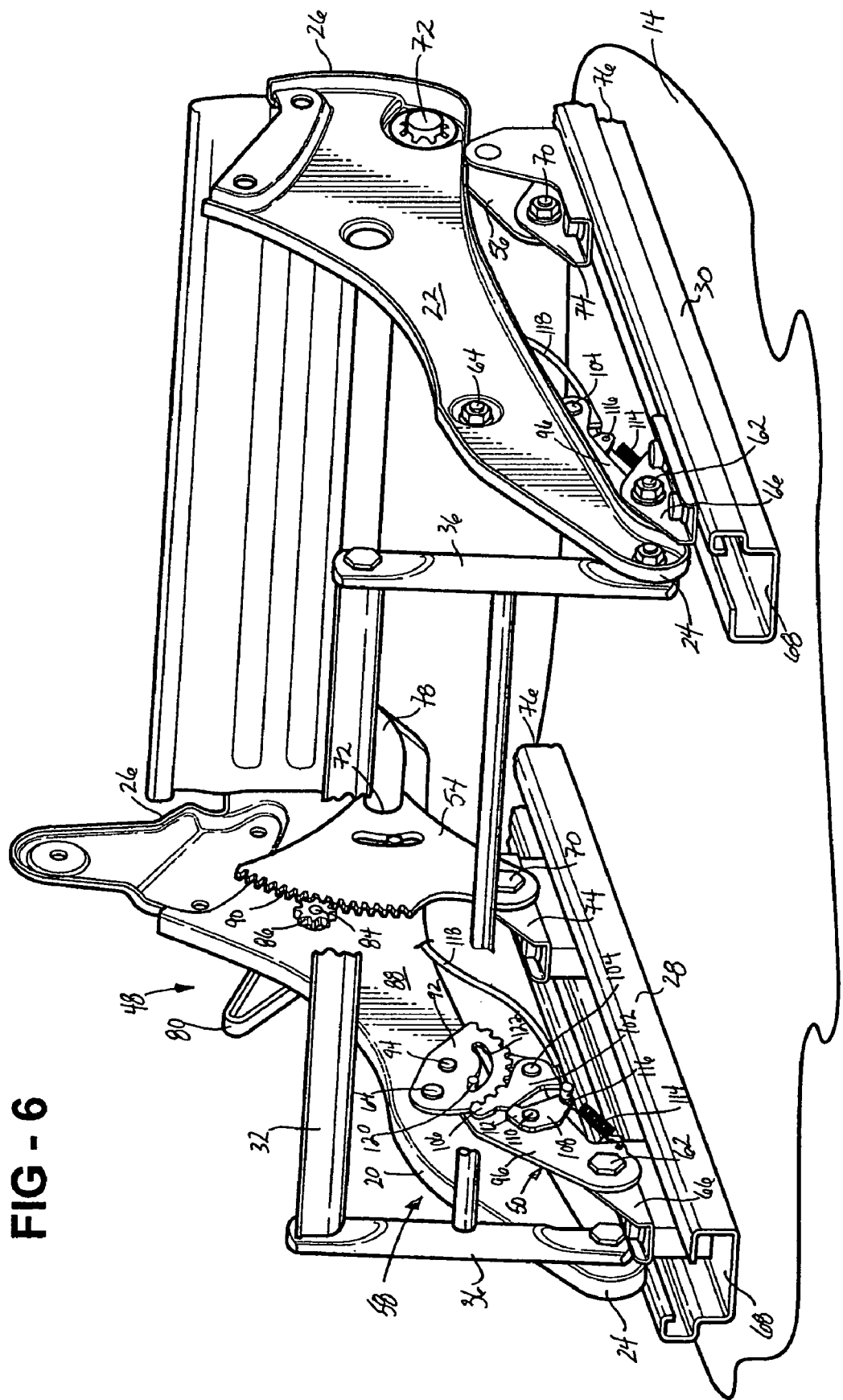
FIG. 6 is a fragmentary, left front perspective view of the seat assembly illustrating the vertical height adjuster in a lowered seating position and the rocker mechanism in a level seating position.
Figure 7:
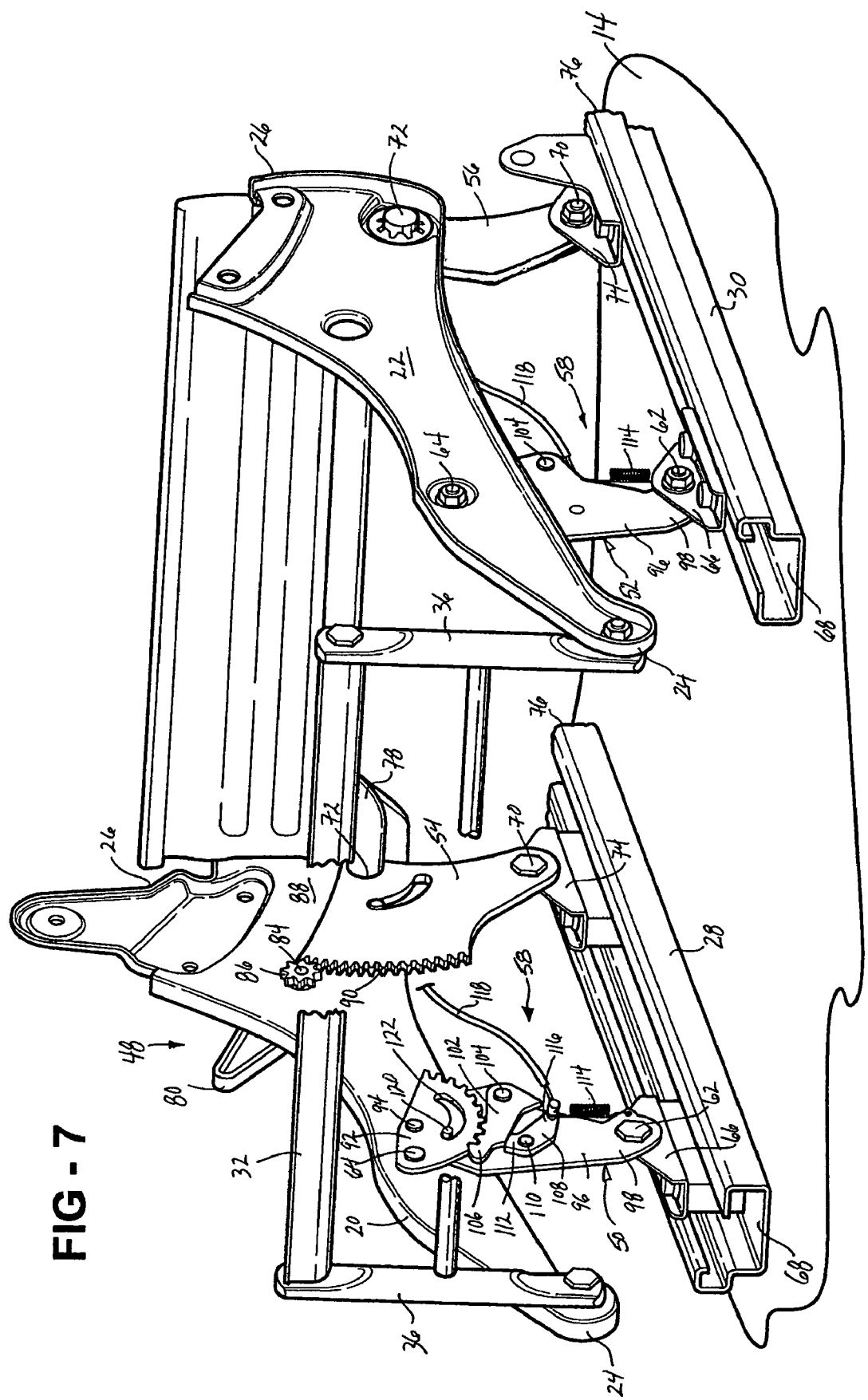
FIG. 7 is a fragmentary, left front perspective view of the seat assembly illustrating the vertical height adjuster in a raised seating position and the rocker mechanism in the level seating position.
Figure 8:
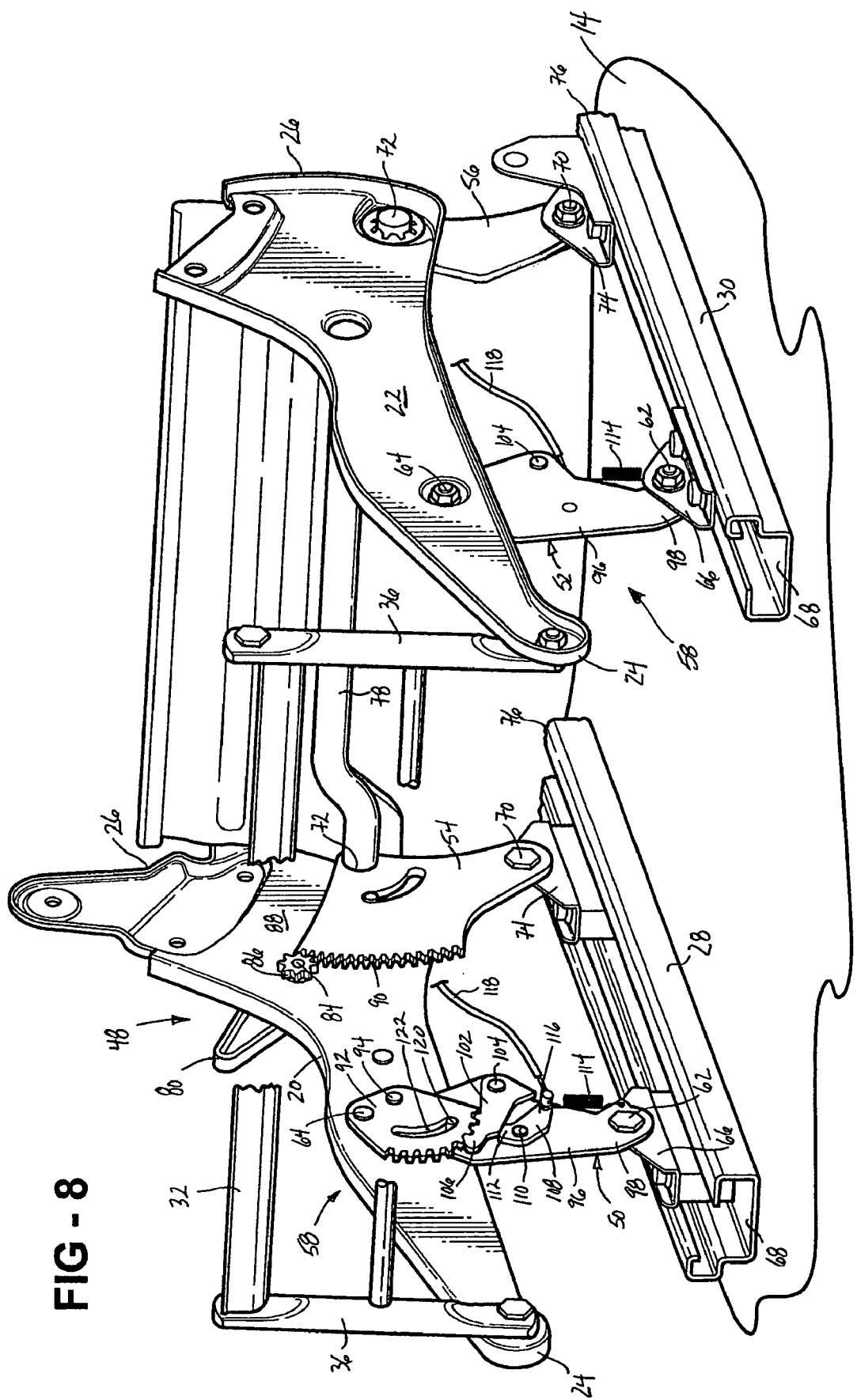
FIG. 8 is a fragmentary, left front perspective view of the seat assembly illustrating the vertical height adjuster in the raised seating position and the rocker mechanism in a rearwardly tiled seating position.

Referring to FIGS. 1 and 2, a vertical height adjuster or four-bar linkage, generally shown at 48, is provided for selectively adjusting the vertical height of the seat assembly 10 relative to the floor 14 of the vehicle and simultaneously providing fore and aft movement of the seat assembly 10 during vertical height adjustment. The vertical height adjuster 48 moves the seat assembly 10 between a plurality of seating positions between a lowered seating position, as shown in FIGS. 1, 5 and 6, and a raised seating position, as shown in FIGS. 7 and 8. Referring to FIGS. 1 and 2, the vertical height adjuster 48 is operatively coupled between the risers 20, 22 and the track assemblies 28, 30. More specifically, the vertical height adjuster 48 includes a pair of front adjuster links, generally indicated at 50, 52, and a pair of rear adjuster links 54, 56. Each of the front adjuster links 50, 52 extend between a first pivot 62 and a second pivot 64. The first pivots 62 pivotally connect the front links 50, 52 to a mounting bracket 66 fixedly secured to the respective track assembly 28, 30, adjacent a forward end 68 thereof. The second pivots 64 pivotally connect the front links 50, 52 to the respective riser 20, 22, adjacent the forward end 24 thereof.

Figure 4:
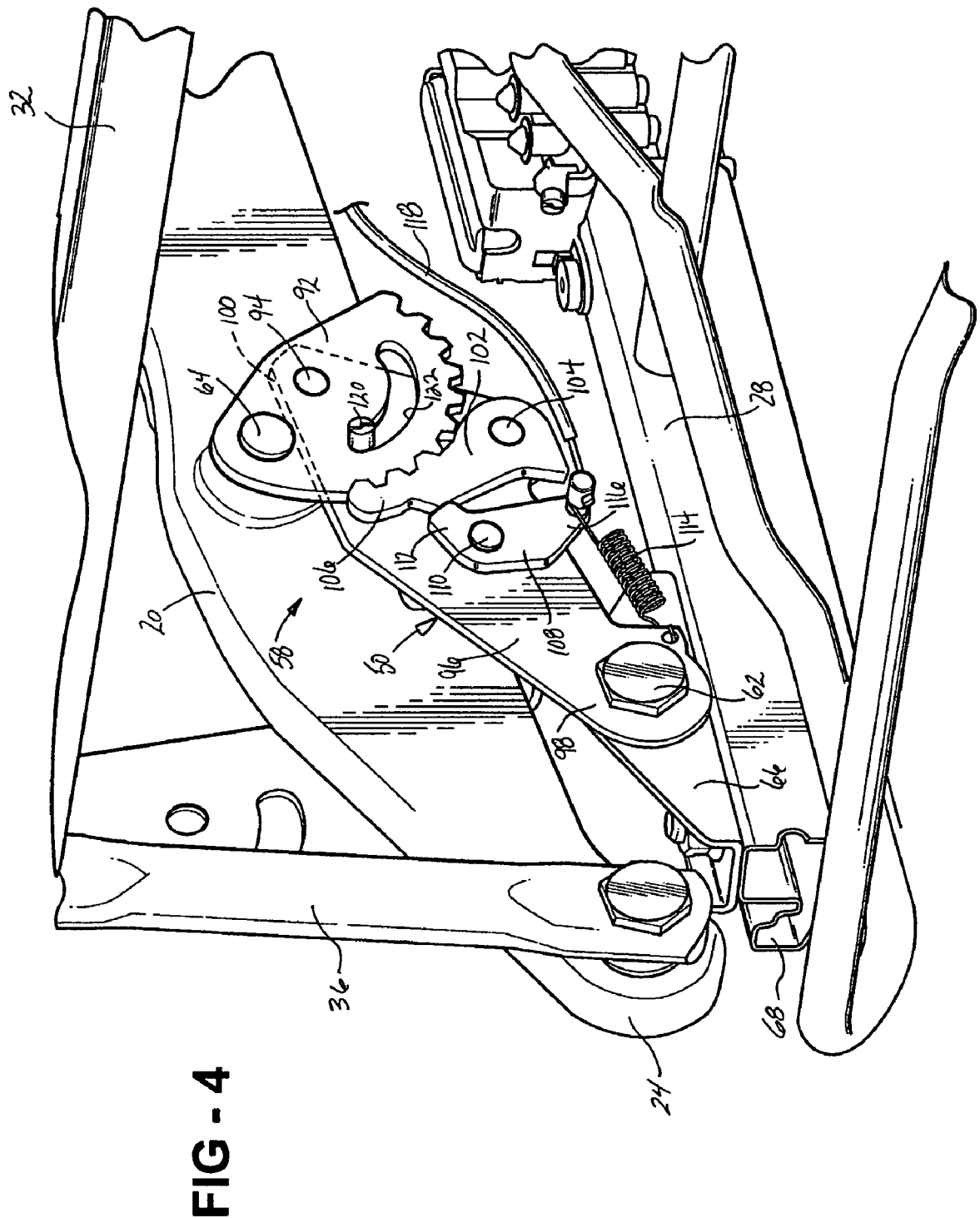
FIG. 4 is an enlarged perspective view of the rocker mechanism.

Referring to FIG. 4, each of the front adjuster links 50, 52 comprise a rocker mechanism, generally shown at 58, for adjusting the angular position, or inclination, of the seat cushion 12 relative to the floor 14 of the vehicle. The rocker mechanisms 58 pivot or tilt the seat assembly 10 between a plurality of angled seating positions between a level seating position, as shown in FIGS. 1 and 5 through 7, and a rearwardly tilted seating position, as shown in FIG. 8. It will be appreciated that the rocker mechanisms 58 may also tilt the seat assembly 10 forwardly to provide a forwardly tilted seating position without varying from the scope of the invention. The rocker mechanisms 58 and their operation will be more fully described below.

Referring to FIGS. 5 and 6, each of the rear adjuster links 54, 56 extend between a first pivot 70 and a second pivot 72. The first pivots 70 pivotally connect the rear links 54, 56 to a mounting bracket 74 fixedly secured to the respective track assembly 28, 30, adjacent a rearward end 76 thereof. The second pivots 72 pivotally connect the rear links 54, 56 to the respective riser 20, 22, adjacent the rearward end 26 thereof. A cross tube 78 extends laterally between the risers 20, 22 to interconnect each of the rear adjuster links 54, 56 to assist in stabilizing the seat assembly 10 and synchronize the movement of each of the front 50, 52 and rear 54, 56 adjuster links.

Figure 3:
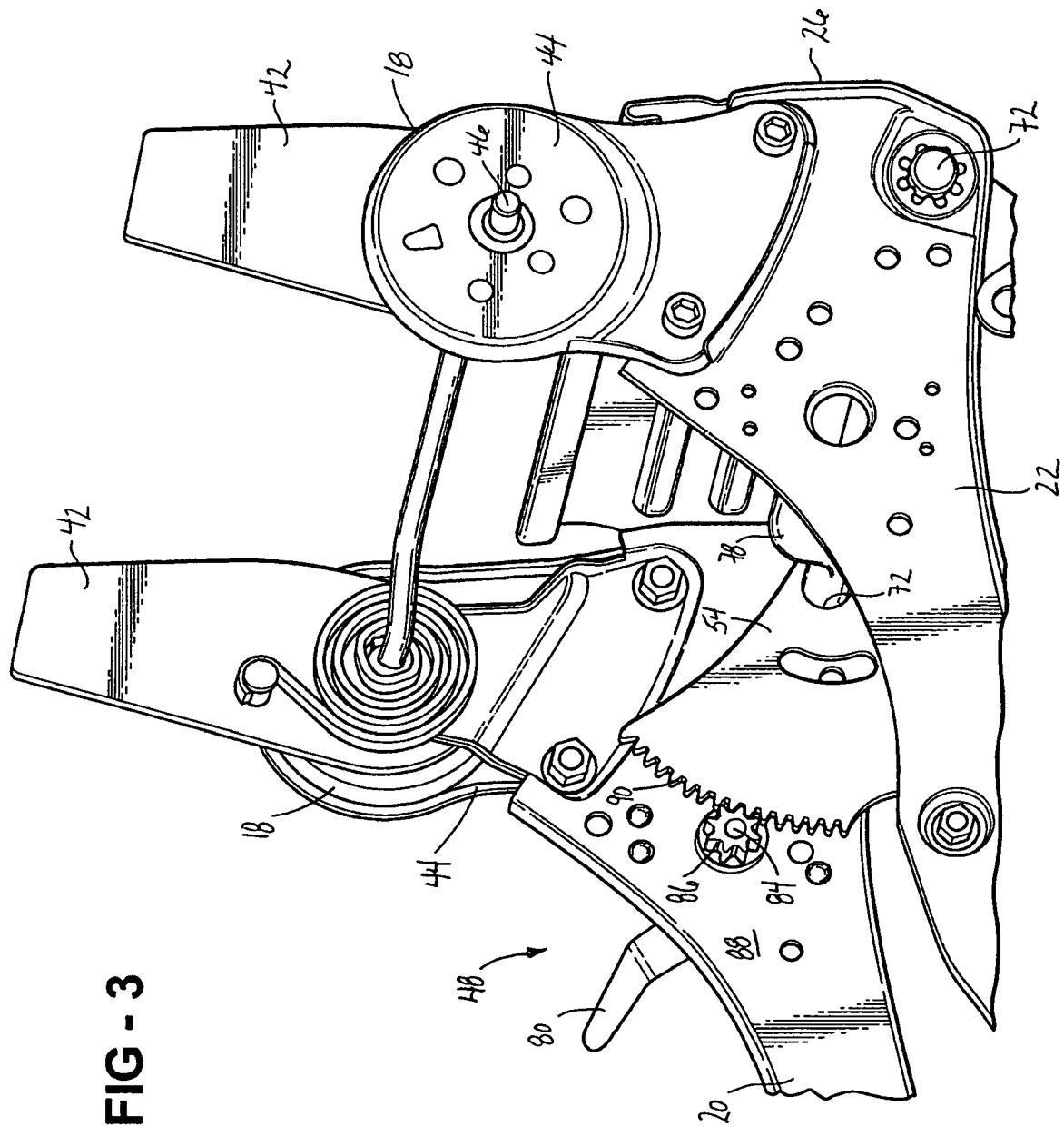
FIG. 3 is an enlarged perspective view of the vertical height adjuster.

Referring to FIGS. 3 and 6, the vertical height adjuster 48 includes a handle actuator 80 operatively coupled to at least one of the rear adjuster links 54, 56 for actuating and allowing the selective vertical movement of the seat assembly 10. In the embodiment shown, the handle actuator 80 is operatively coupled to the rear adjuster link 54. The handle actuator 80 is rotatably connected to the riser 20 by a shaft 84. The shaft 84 extends through the riser 20 and a toothed sprocket or gear 86 is mounted to an end of the shaft 84 adjacent an inboard side 88 of the riser 20. The rear adjuster link 54 includes an arcuate toothed segment 90 for meshed engagement with the gear 86.

In operation, to adjust the vertical height of the seat assembly 10 the handle actuator 80 is selectively and repeated pulled upwardly in a cranking manner to rotate the gear 86. A pump or clutch mechanism, as is commonly known in the art, may be included between the handle actuator 80 and the gear 86 for allowing the selective and repeated cranking of the handle actuator 80 and rotation of the gear 86. The gear 86 is meshed with the toothed segment 90 of the rear adjuster link 54 and rotates to drive the rear adjuster link 54 pivotally about the first pivot 70. Starting with the seat assembly 10 in the lowered seating position, shown in FIGS. 5 and 6, driving the rear adjuster link 54 causes the seat assembly 10 to move forwardly and upwardly toward the raised seating position, shown in FIGS. 7 and 8. More specifically, driving the rear adjuster link 54 causes both of the rear adjuster links 54, 56 and, in turn, the front adjuster links 50, 52 to pivot in a first direction and provide movement of the risers 20, 22, and thus the seat assembly 10, about a pair of arcs with center axes defined by the first pivots 62, 70 of the respective front 50, 52 and rear 54, 56 links. That is, the arcuate path of movement provided by the front 50, 52 and rear 54, 56 adjuster links provides vertical height adjustment and simultaneous fore and aft movement of the seat assembly 10. Once adjusted as desired, the handle actuator 80 is lowered to lock and prevent further movement between the gear 86 and toothed segment 90 to maintain the adjusted height of the seat assembly 10.

Finally, referring to FIG. 4, each of the rocker mechanisms 58 include an eccentric, toothed sector gear 92 pivotally mounted to the respective riser 20, 22 by the second pivot 64. The sector gear 92 includes a mounting pin 94 spaced from and offset from the second pivot 64. A rocker link 96 couples the sector gear 92 to the mounting bracket 66 on the track assemblies 28, 30. More specifically, the rocker link 96 includes a first end 98 pivotally connected to the mounting bracket 66 on the track assemblies 28, 30 at the first pivot 62 and an opposite second end 100 pivotally connected to the mounting pin 94 on the sector gear 92. A toothed pawl 102 extends between a proximal end 104 that is pivotally mounted to the rocker link 96 and an opposite distal end 106 for locking meshed engagement with the sector gear 92. A release lever 108 is pivotally mounted to the rocker link 96 at pivot 110 and includes a first end 112 for selective engagement with the pawl 102. A bias spring 114 extends between the first end 98 of the rocker link 96 and a second end 116 of the release lever 108 for biasing the release lever 108 into engagement with the pawl 102. A Bowden cable 118 extends between the second end 116 of the release lever 108 and a remote mounted release handle (not shown) for releasing the respective rocker mechanisms 58.

In operation, to adjust the angular position, or inclination, of the seat cushion 12, the seat occupant actuates the release handle to unlock the rocker mechanisms 58. The release handle pulls on the Bowden cable 118 to pivot the release lever 108 out of engagement with the pawl 102, against the biasing force of the spring 114. The teeth on the pawl 102 disengage from the teeth on the sector gear 92 to unlock the rocker mechanisms 58. The risers 20, 22 are now free to pivot about the second pivots 72 of the rear adjuster links 54, 56 and the seat occupant can manually tilt the seat assembly 10 to one of the plurality of angled seating positions between the level seating position, shown in FIGS. 5 through 7, and the rearwardly tilted seating position, shown in FIG. 8. The forward ends 24 of the risers 20, 22 move up and down about an arc with a center axis defined by the second pivots 72 of the rear links 54, 56 and are guided and supported by the rocker links 96. More specifically, the sector gear 92 is free to pivot about the second pivot 64 and the offset mounting pin 94 travels about an eccentric path guiding the second end 100 of the rocker link 96 to support the risers 20, 22 in the selected angular position. A guide pin 120 extending from the rocker link 96 travels along an arcuate guide slot 122 in the sector gear 92 to define the range of movement of the sector gear 92 and rocker link 96. Once the desired angular position of the seat cushion 12 is achieved, the release handle is released and the spring 114 forces the release lever 108 to engage the pawl 102, thus forcing the teeth of the pawl 102 into engagement with the teeth on the sector gear 92 to lock the rocker mechanisms 58 and maintain the angular position of the seat cushion 12.

The invention has been described here in an illustrative manner, and it is to be understood that the terminology used is intended to be in the nature of words or description rather than limitation. Many modifications and variations of the present invention are possible in light of the above teachings. It is, therefore, to be understood that within the scope of the appended claims, the invention may be practiced other than as specifically enumerated within the description.

The invention claimed is:

1. A seat assembly adapted to be coupled to the floor of an automotive vehicle, said seat assembly comprising:
   a pair of spaced apart risers extending between forward and rearward ends for supporting the seat assembly above the floor of the vehicle;
   a seat cushion coupled to said risers for supporting an occupant in said seat assembly;
   a seat back pivotally coupled to said risers; and
   a rocker mechanism for selectively adjusting an angular position of said seat cushion relative to the floor, said rock& mechanism including a rear adjuster link defining a first pivot adapted for pivotally connecting said rearward ends of said risers to the floor, a sector gear coupled to said riser adjacent said forward end thereof by a pivotal connection and including a mounting pin offset from said pivotal connection to said riser, a rocker link having a first end adapted to be pivotally coupled to the floor and a second end pivotally coupled to said mounting pin on said sector gear for supporting and guiding said forward ends of said risers during pivotal movement about said first pivot, and a pawl pivotally coupled to said rocker link for selectively engaging and locking said sector gear to maintain said selectively adjusted angular position of said seat cushion.

2. A seat assembly as set forth in claim 1 wherein said pawl includes a distal end having teeth for engaging teeth on said sector gear.

3. A seat assembly as set forth in claim 2 wherein said sector gear includes an arcuate guide slot and said rocker link includes a guide pin extending therefrom for traveling along said arcuate guide slot to define a range of angular adjustment of said seat cushion.

4. A seat assembly as set forth in claim 3 including a release lever pivotally mounted to said rocker link and having a first end for selective engagement with said pawl and an opposite second end.

5. A seat assembly as set forth in claim 4 including a spring for biasing said release lever into engagement with said pawl.

6. A seat assembly as set forth in claim 5 wherein said spring extends between said second end of said release lever and said first end of said rocker link.

7. A seat assembly as set forth in claim 6 including a Bowden cable operatively coupled to said second end of said release lever for pivoting said first end of said release lever out of engagement with said pawl thereby actuating said rocker mechanism.

8. A seat assembly as set forth in claim 7 including a pair of spaced apart track assemblies extending longitudinally between forward and rearward ends for mounting the seat assembly to the floor of the vehicle.

9. A seat assembly as set forth in claim 8 wherein said first pivot pivotally connects said rearward ends of said risers to said rearward ends of said respective track assemblies and said first end of said rocker link is pivotally coupled to said forward end of said track assembly.

10. A seat assembly as set forth in claim 9 including a vertical height adjuster operatively coupled between said risers and said track assemblies for selectively vertically adjusting said seat assembly relative to the floor while simultaneously providing fore and aft adjustment, said vertical height adjuster including a pair of front adjuster links pivotally connecting said forward ends of said risers and said track assemblies, a pair of rear adjuster links pivotally connecting said rearward ends of said risers and said track assemblies, and an actuator operatively coupled to said vertical height adjuster for selectively actuating said vertical height adjuster to provide simultaneous height and fore/aft adjustment of said seat assembly wherein said front and rear adjuster links define an arcuate path of adjustment travel relative to the floor of the vehicle.

11. A seat assembly adapted to be coupled to the floor of an automotive vehicle, said seat assembly comprising:
   a pair of spaced apart risers extending between forward and rearward ends for supporting the seat assembly above the floor of the vehicle;
   a pair of spaced apart track assemblies extending between forward and rearward ends for mounting the seat assembly to the floor of the vehicle;
   a seat cushion coupled to said risers for supporting an occupant in said seat assembly;
   a seat back pivotally coupled to said risers;
   a vertical height adjuster operatively coupled between said risers and said track assemblies for selectively vertically adjusting said seat assembly relative to the floor while simultaneously providing fore and aft adjustment, said vertical height adjuster including a pair of front adjuster links pivotally connecting said forward ends of said risers and said track assemblies, a pair of rear adjuster links pivotally connecting said rearward ends of said risers and said track assemblies, and an actuator operatively coupled to said vertical height adjuster for selectively actuating said vertical height adjuster to provide simultaneous height and fore/aft adjustment of said seat assembly wherein said front and rear adjuster links define an arcuate path of movement relative to the floor of the vehicle; and
   wherein each of said front adjuster links define a rocker mechanism for selectively adjusting an angular position of said seat cushion relative to the floor, said rocker mechanism including a sector gear coupled to said riser adjacent said forward end thereof by a pivotal connection and including a mounting pin offset from said pivotal connection to said riser, a rocker link having a first end pivotally coupled to said forward end of said track assembly and a second end pivotally coupled to said mounting pin on said sector gear for supporting and guiding said forward ends of said risers during pivotal movement about said pair of rear adjuster links, and a pawl pivotally coupled to said rocker link for selectively engaging and locking said sector gear to maintain said selectively adjusted angular position of said seat cushion.

* * * * *